United States Patent [19]

Loren

[11] Patent Number: 5,044,924
[45] Date of Patent: Sep. 3, 1991

[54] GAS ASSISTED INJECTION MOLDING APPARATUS

[76] Inventor: Norman S. Loren, 24874 Chalk Farm Rd., Warren, Mich. 48091

[21] Appl. No.: 535,313

[22] Filed: Jun. 8, 1990

[51] Int. Cl.$^5$ .............................................. B29C 45/17
[52] U.S. Cl. .................................... 425/542; 425/555
[58] Field of Search ................ 425/535, 533, 542, 555

[56] References Cited

U.S. PATENT DOCUMENTS

| | | | |
|---|---|---|---|
| 3,621,529 | 11/1971 | Kovacs | 425/533 X |
| 3,873,661 | 3/1975 | Kontz | 264/102 X |
| 4,106,887 | 8/1978 | Yasuike et al. | 425/535 X |
| 4,474,717 | 10/1984 | Hendry | 264/45.5 |
| 4,740,150 | 4/1988 | Sayer | 425/542 |
| 4,824,732 | 4/1989 | Hendry et al | 428/542.8 |

FOREIGN PATENT DOCUMENTS 2202181A 9/1988 United Kingdom .

*Primary Examiner*—Richard L. Chiesa
*Attorney, Agent, or Firm*—Krass & Young

[57] ABSTRACT

A gas assisted injection molding apparatus of the type in which a supply of resin is introduced into a cavity in a mold at a resin injection location and a gas injection assembly is provided to introduce gas into the mold cavity at a gas injection location removed from the resin injection location to assist the resin in filling out the mold cavity. The gas injection assembly includes a bore in the mold communicating with the mold cavity, a pin having a size to fit slidably in the bore and including a central axial passage for delivery of gas into the mold cavity through the pin, a power cylinder assembly mounting the pin for movement between an advanced gas injection position in which the pin is positioned in the bore with its forward tip in communication with the mold cavity and a retracted position in which the mold cavity is vented through the bore, and an annular edge on the pin operative to remove obstructions with each forward movement of the pin from its retracted position to its advanced position.

11 Claims, 3 Drawing Sheets

GAS ASSISTED INJECTION MOLDING APPARATUS

FIELD OF THE INVENTION

This invention relates to injection molding and more particularly to gas assisted injection molding.

BACKGROUND OF THE INVENTION

It is desirable in injection molding to urge the molten thermoplastic resin material into contact with the mold surfaces by exerting pressure on the resin. This aids the external surface of the plastic material in assuming the precise shape dictated by the mold surface. The pressure also assists the filling of the mold space with molten resin even if the space is elongated or narrow and is normally difficult to fill.

In gas assisted injection molding, the articles are produced by injecting molten resin into the mold cavity and injecting a quantity of pressurized gas into the resin to fill out the mold cavity and form a hollow portion in the resin. The gas is preferably an inert gas such, for example, as nitrogen. Pressure is maintained on the gas in the hollow gas space within the resin until the resin has sufficiently set, whereafter the pressurized gas is released from the molded part hollow space and the molded part is removed from the mold cavity.

This gas assisted procedure is advantageous since the molded part produced utilizes somewhat less plastic material and is lighter than if the part were solid plastic. More importantly, the plastic in the gas assisted procedure will not have a tendency to shrink away from the mold walls during cooling since the internal gas pressure will keep it pressed against the walls, thereby minimizing or eliminating surface blemishes such as sink marks. Further, the gas assisted procedure eliminates the need to utilize the screw ram of the injection molding machine to pack out the mold during the molding cycle, thereby minimizing or eliminating molded in stresses in the molded part.

The gas may be introduced into the mold through the same nozzle utilized to inject the resin or may be introduced into the mold at a location remote from the resin injection nozzle by a separate gas injection mechanism. One such separate mechanism is shown for example in U.S. Pat. No. 4,740,150 in which a valve member coacts with a conical seat of a valve port opening into the mold cavity to allow introduction of gas into the mold cavity through a central bore in the valve member and to allow venting of the mold cavity by retraction of the valve member to allow the pressurized gas to escape from the mold cavity through the valve port. This arrangement suffers from the disadvantages that the seal is affected by the forced seating of the tip of the valve member in the conical seat of the valve port with resultant strain on the various component parts. Also, the various parts must be precisely machined and precisely aligned relative to each other to provide an effective seal, and the seal is readily destroyed when resin contaminants are deposited on the conical valve seat and/or on the tip of the valve member.

It has also been suggested that the separate gas injection mechanism might comprise a pin slidably mounted in a bore in the mold so that the pin may be moved between an advanced position in which the forward tip of the pin is positioned in communication with the mold cavity to allow the introduction of gas into the mold cavity through a central bore in the pin, and a retracted position in which the gas is vented through the bore. However, this arrangement suffers from the disadvantage that, with extended usage, the bore may become wholly or partially plugged with resin with the result that the pin can no longer move forwardly to its advanced position to achieve the gas injection operation.

SUMMARY OF THE INVENTION

This invention is directed to the provision of an improved gas injection apparatus for a gas assisted injection molding apparatus.

More specifically, this invention is directed to the provision of a gas injection apparatus for a gas assisted injection molding apparatus which is simple in construction and yet which operates to effectively introduce gas into the mold cavity even over extended periods of usage.

The invention relates to a gas assisted injection molding apparatus of the type in which a supply of resin is introduced into a cavity in a mold at a resin injection location and gas injection means are provided to introduce gas into the mold cavity at a gas injection location removed from the resin injection location to assist the resin in filing out the mold cavity. According to the invention, the apparatus is characterized in that the gas injection means includes a bore in the mold communicating with the mold cavity, a pin having a size to fit slidably in the bore and including a central axial passage for delivery of gas into the mold cavity through the pin, means mounting the pin for movement between an advanced gas injection position in which the pin is positioned in the bore with its forward tip in communication with the mold cavity and a retracted position in which the mold cavity is vented through the bore, and means defining an annular edge on the pin operative to remove obstructions in the bore with each forward movement of the pin from its retracted position to its advanced position. This arrangement provides an effective means of introducing gas into the cavity and an effective means of venting gas from the cavity while ensuring that the gas injection bore is maintained unobstructed so as to allow continued long-term successful operation of the gas injection apparatus.

The annular edge is defined on the pin by first and second surfaces converging to form the edge. The first and second surfaces define an included angle of less than 180° at the edge and preferably define an included angle at the edge of no more than 90°.

In one embodiment of the invention apparatus, the pin includes a side wall surface slidably received in the bore of the mold and a front end surface generally normal to the side wall surface and the annular edge on the pin is defined at the intersection of the front end surface and the side wall surface.

In other embodiments of the invention apparatus, the pin includes a main body portion fitting slidably in the bore in the mold and a forward reduced diameter portion forming an annular shoulder with the main body portion and the annular edge on the pin is defined at the outer circumference of the annular shoulder.

All embodiments of the invention embody the further feature that there is no forced seating of the members to effect a seal, eliminating any stresses to the mold components. The seal is effected by the slidable engagement between the pin and the bore such that any molten resin material will freeze during entry into the slidable clearance between the pin and the bore. The means advancing the pin may therefore be fully extended in the advanced gas injecting position of the pin so that any forces are self-contained within the advancing means rather than creating stresses at the sealing interface.

DETAILED DESCRIPTION OF THE PREFERRED EMBODIMENTS

The invention gas injection apparatus is intended for use in association with a gas assisted injection molding process of the type in which hot resin is injected into a mold cavity, gas is injected into the resin to fill out the mold cavity with resin, the gas is held at a pressure while the resin sets up, the gas is vented from the mold, and the mold is opened to remove the molded part.

Figure 1:
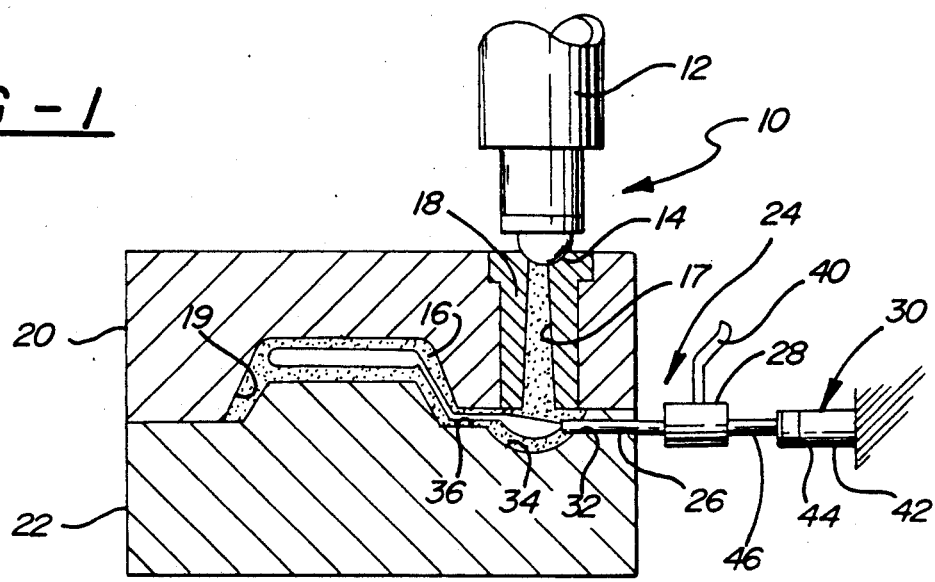
FIG. 1 is a cross-sectional somewhat schematic view of a gas assisted molding apparatus according to the invention.

In the apparatus seen schematically in FIG. 1, an injection nozzle 10 is connected in known manner to an injection molding machine 12 including a screw or plunger (not shown) which is actuated in known manner to force resin through nozzle outlet 14 so as to inject a quantity of the hot resin 16 through a sprue 17 defined by a sprue bushing 18 into a mold cavity 19 defined, for example, by first and second mold halves 20 and 22. The quantity of resin injected is a "short shot," that is, less than the amount required to totally fill the mold cavity 19. Following the introduction of the resin into the mold cavity, pressurized gas such as nitrogen is introduced into the mold by gas injection means 24 to fill out the mold cavity with resin. The part to be molded will typically have thicker and thinner portions and the thicker portions will act as an internal runner system to define a flow path for the nitrogen. Since the thicker portions have a significantly higher resin melt temperature, the gas will follow the path of least resistance and the resin material in the thicker portions will continue to flow by virtue of the gas pressure so as to fill out the mold with the resin. Gas pressure is maintained within the mold in the hollow portion of the part until such time as the cooling cycle of the part is sufficient and the resin material has cured, whereafter the gas pressure is suitably vented and the mold is opened to remove the part. The present invention provides an improved means for injecting gas into the mold cavity and venting gas from the mold cavity.

Gas injection means 24 includes a pin 26, a connector block 28, a hydraulic cylinder assembly 30, and a cylindrical bore 32 in mold part 22.

Bore 32 in mold part 22 opens at its outer end 32a in the outer face 22a of mold part 22 and opens at its inner end 32b in a reservoir 34 defined by mold part 22 and communicating via a gate 36 with mold cavity 18.

Pin 26 has a cylindrical cross-sectional configuration sized to fit slidably in bore 32 and includes a central axial bore 26a communicating with a reduced diameter central bore 26b which in turn opens at its inner end in the end face 26c of the pin. End face 26c of the pin is disposed generally normal to the cylindrical side wall 26d of the pin so as to define a circular annular edge 26e at the right angle intersection of end face 26c and side wall 26d.

Figure 2:
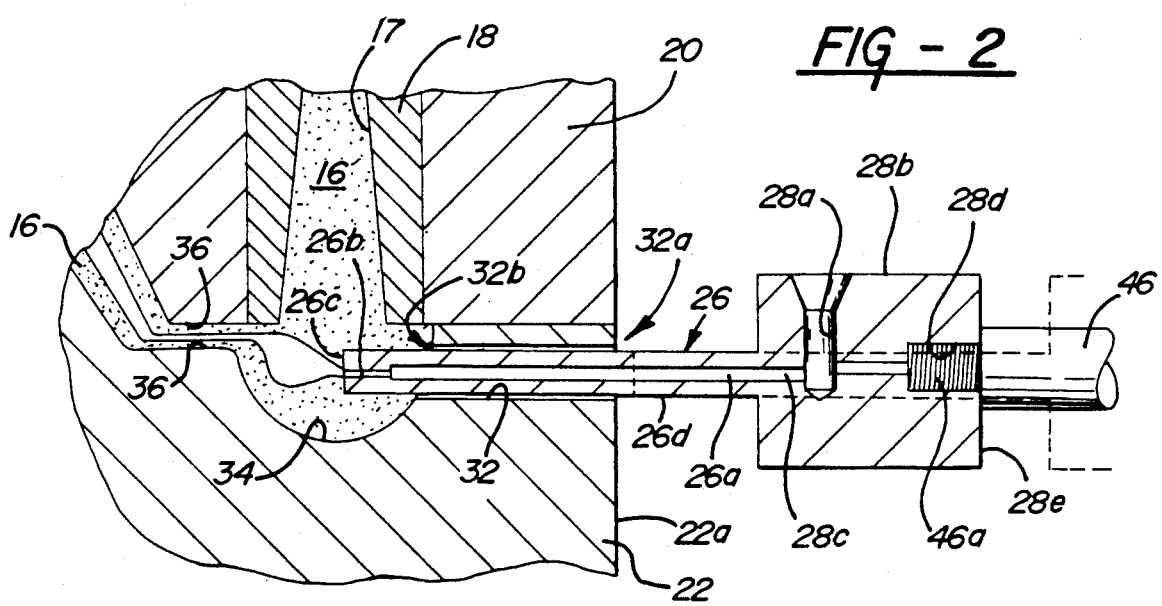
FIGS. 2 and 3 are detailed views of the gas injection mechanism of the molding apparatus of FIG. 1.
Figure 3:
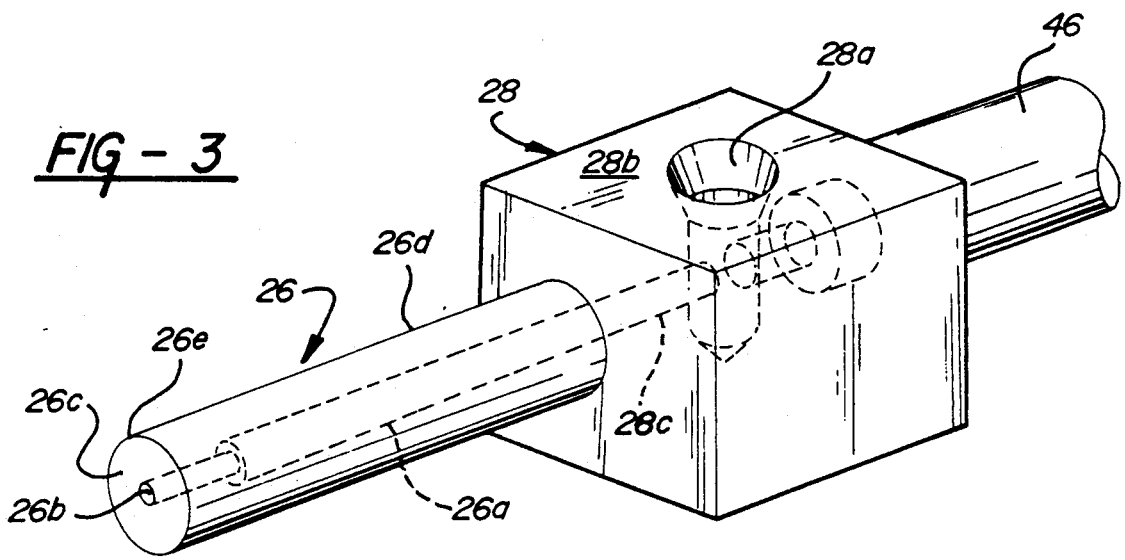

Connector block 28 may be formed as a separate element from pin 26 or may, as shown in FIGS. 2 and 3, be formed integral with pin 26. Block 28 defines a gas inlet passage 28a opening in the upper face 28b of the block for communication with a gas line 40 and further includes a passage 28c communicating at one end with passage 28a and communicating at its other end with passage 26a in pin 26. Passages 28a, 28c, 26a and 26b will be seen to coact to define a gas injection conduit or path extending from gas line 40 to reservoir 34 with the pin 26 in the advanced or gas injecting position seen in FIGS. 1 and 2. The reservoir 34 is of sufficient dimensions such that the pin 26, in its advanced or gas injecting position, is totally surrounded by resin from the end of the bore 32 to the tip of the pin. The reservoir may be within the sprue, within the runner, or in the article itself.

Cylinder assembly 30 may take any of various forms and, for example, may include a cylinder housing 42, piston 44, and a piston rod 46 connected at one end to piston 44 and connected at its other end by a threaded fitting 46a threadably received in a threaded bore 28d in the face 28e of connector block 28 opposite pin 26.

Cylinder assembly 30 operates to move the pin between an advanced gas injection position, as seen in FIGS. 1 and 2, in which the piston of the cylinder assembly is fully advanced or extended and the pin is positioned in the bore 32 with its forward tip end 26c positioned in reservoir 34 and with bore 26b in communication with reservoir 34 and thereby mold cavity 18, and a retracted position, seen in dotted lines in FIG. 2, in which the piston of the cylinder assembly is fully retracted and the pin is retracted from bore 32 so as to vent the mold cavity 19 through bore 32 to relieve the pressure in the mold and allow opening of the mold parts to remove the molded article. As the pin is again moved from its retracted position to its advanced position preparatory to a new injection molding cycle, the annular edge 26e of the pin coacts with the cylindrical surface of bore 32 to remove any obstructions in the bore. Such obstructions may include, for example, resin material that has formed at the entrance of the bore by virtue of the resin attempting to enter the clearance between the pin and the bore and freezing off during the injection of resin, or during the injection of gas, into the mold cavity through the pin, or resin material that has entered the bore during the retraction of the pin 40 to achieve the venting operation. The annular edge 26e will be seen to provide a self-cleaning function for the gas injection means and ensures that the bore 32 will not become obstructed over extended periods of usage. As will be apparent, without the self-cleaning feature, obstruction of the bore 32 would render the gas injection means inoperative because of the inability of the pin 26 to move through the bore 32 to position the inner tip of the pin within the reservoir 34 to properly accomplish the gas injection step.

It will be seen that the axis of the pin may be suitably placed in a relationship other than parallel to the axis of ejection of the part. In this regard, the retraction of the pin from the reservoir permits normal part ejection without locking interference from the pin.

Figure 4:
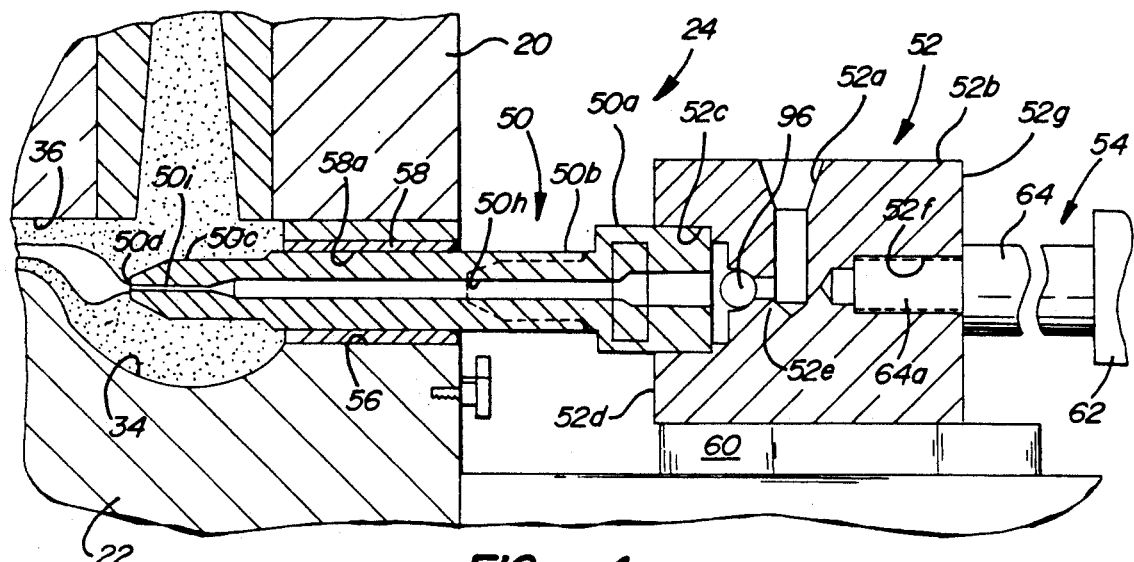
FIG. 4 is a view of a second embodiment of gas injection mechanism.
Figure 5:
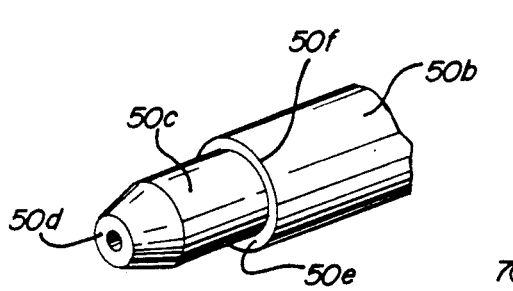
FIG. 5 is a detailed view of a portion of the gas injection mechanism of FIG. 4.

A modified form of gas injection means 24 is seen in FIGS. 4 and 5. The gas injection means of FIGS. 4 and 5 includes a pin 50, a connector block 52, a hydraulic cylinder assembly 54, and a bore 56 in the lower mold part 22.

Pin 50 includes a threaded rear mounting portion 50a, a main body cylindrical portion 50b sized to be slidably received in the bore 58a of a hardened bushing 58 positioned in mold bore 56, and a reduced diameter front end portion 50c of generally bullet configuration terminating in a flat end wall 50d. Reduced diameter front end portion 50c coacts with main body portion 50b to define an annular shoulder 50e and shoulder 50e coacts with the cylindrical surface of main body portion 50b to form an annular circular edge 50f at the intersection of shoulder 50e and surface 50b. A central bore 50g is provided in mounting portion 50a; a reduced diameter central bore 50h is provided in main body portion 50b; and a further reduced diameter central bore 50i is provided in reduced diameter front end portion 50c and opening in end wall 50d.

Connector block 52 includes an inlet passage 52a opening in upper block base 52b for receipt of gas line 40; a threaded blind bore 52c in end face 52d for threaded receipt of the threaded mounting portion 50a of pin 50; a lower face 52e riding on an anti-rotation pad 60; a central bore 52e interconnecting bores 52a and 52c; and a threaded blind bore 52f opening in the rear face 52g of the block.

Cylinder assembly 54 includes a cylinder body 62 and a piston rod 64 having a reduced diameter threaded front end 64a for threaded receipt in the threaded bore 52f of connector block 52.

In the assembled relationship of pin 50, connector block 52a, and hydraulic cylinder assembly 54, it will be seen that a continuous gas passage is defined by passages 52a, 52e, 50g, 50h and 50i extending from gas line 40 to the reservoir 34 of the mold with the gas injection means in the advanced or forward position seen in FIG. 4. In this position, gas may be injected into the mold to perform the gas assist operation with respect to the resin to facilitate the filling out of the mold by the resin, whereafter the cylinder assembly 54 may be actuated to move the pin to a retracted position, as seen in dotted lines in FIG. 4, in which the mold cavity is vented to the atmosphere through bushing bore 58a to relieve the gas pressure in the mold and allow the mold parts 20, 22 to be opened to remove the finished part.

When it is time to begin a new injection molding operation, hydraulic cylinder 54 is actuated in a sense to fully extend piston rod 64 and move the pin 50 from its retracted to its advanced position. As the pin moves forwardly within the bushing bore 58a, the annular edge 50f formed at the intersection of shoulder 50e and main body portion 50b coacts with bushing bore 58a to remove any obstructions in bore 58a and thereby clean the bore with each forward movement of the pin. To ensure total cleaning of the bore, the edge 50f of the pin extends into the reservoir 34 with the pin in its advanced position as seen in FIG. 4.

Figure 6:
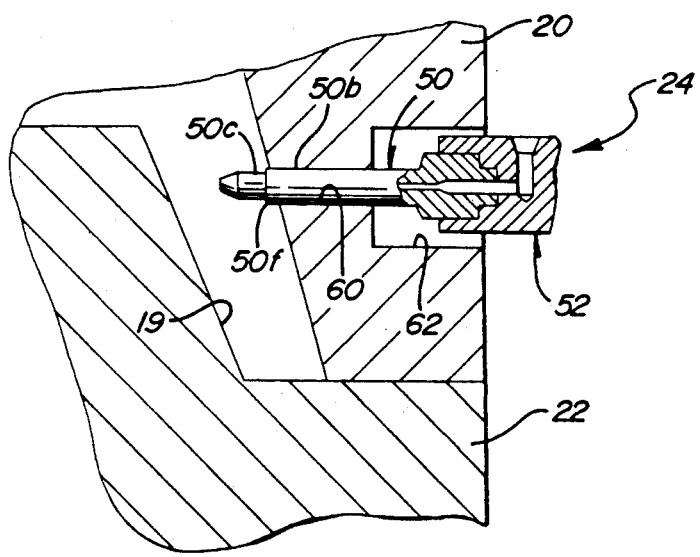
FIG. 6 is a view of a third embodiment of gas injection mechanism.

The modified form of gas injection means 24 seen in FIG. 6 is generally similar to the gas injection means 24 of FIGS. 4 and 5 with the exception that the main body portion 50b of the pin 50 is slidably received in a bore 60 in mold part 20; the rear mounting portion 50c of the pin and the connector block 52 are received in a counterbore 62 in mold part 20; and the front or tip end 50c of the pin is positioned directly in the mold cavity than in a sprue, or runner, or reservoir communicating with the mold cavity. The feature of FIG. 6 of extending the tip of the pin directly into the mold cavity may of course also be used in the embodiment of FIG. 1.

Figure 8:
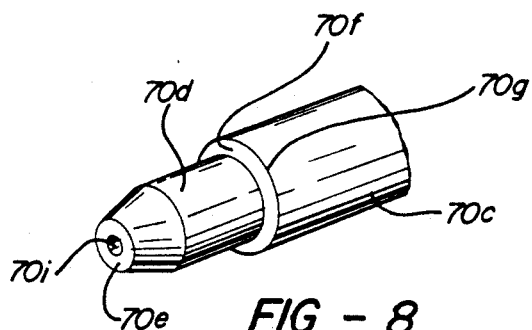
FIG. 8 is a detailed view of a portion of the gas injection mechanism of FIG. 7.
Figure 7:
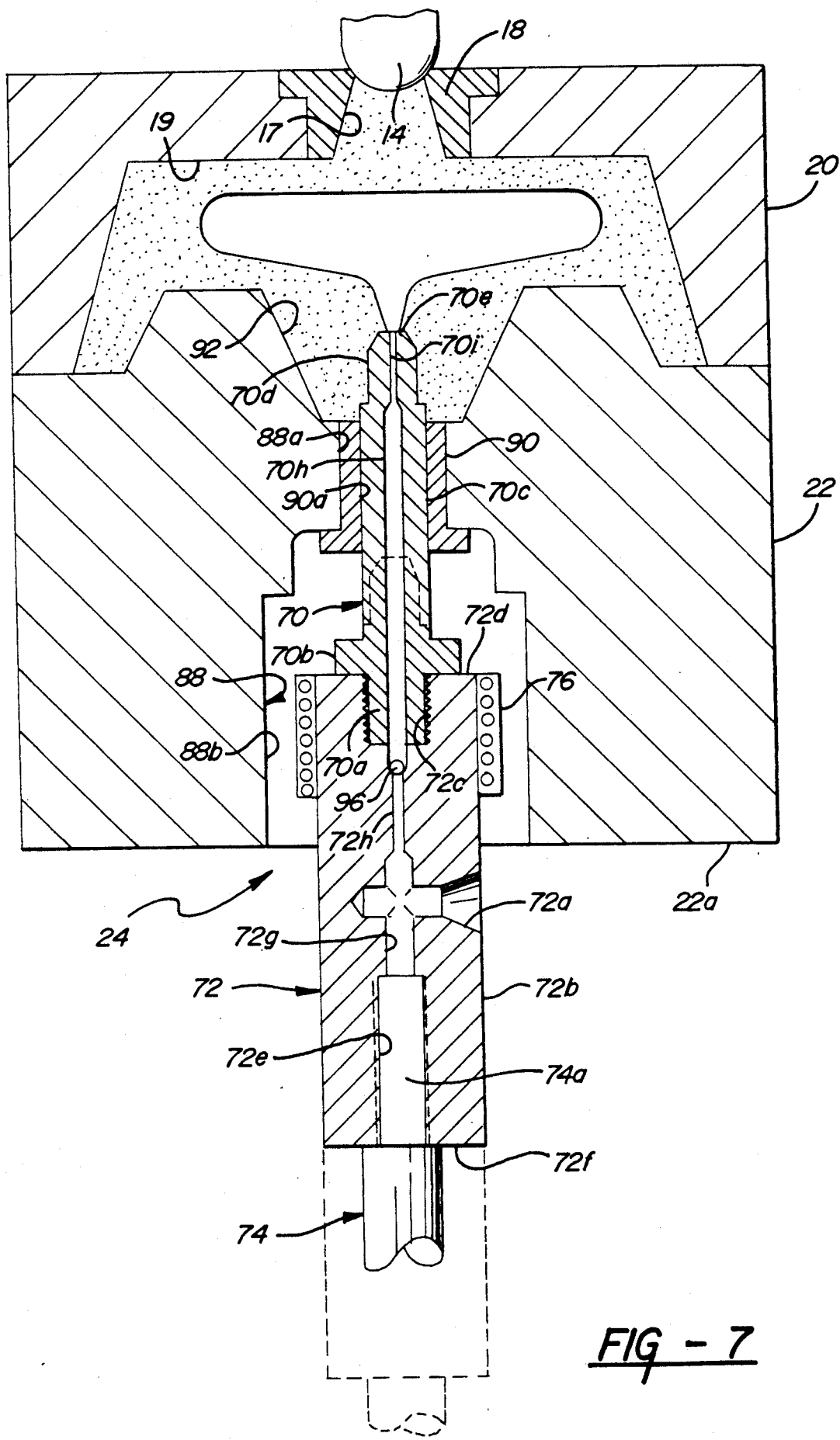
FIG. 7 is a view of a fourth embodiment of gas injection mechanism.

The modified gas injection means 24 seen in FIGS. 7 and 8 is generally similar to the gas injection means 24 of FIGS. 4 and 5 and includes a pin 70, a connector block 72, and a hydraulic cylinder assembly including a piston rod 74.

Pin 70 is of circular cross section and includes a threaded mounting portion 70a; a collar or wrenching flat portion 70b; a cylindrical main body portion 70c for sliding receipt in the bore of the mold; a reduced diameter front portion 70d terminating in a flat front end wall 70e and forming a shoulder 70f coacting with main body portion 70c to define an annular edge 70g; a central bore 70h in pin portions 70a, 70b, and 70c; and a reduced diameter central bore 70i in reduced diameter front pin portion 70d opening in end face 70e.

Connector block 72 is of circular cross section and includes a gas inlet passage 72a opening in the side wall 72b of the block; a threaded bore 72c opening in one end face 72d of the block for threaded receipt of pin threaded mounting portion 70a; a threaded bore 72e opening in the other end face 72f of the block for threaded receipt of a threaded reduced diameter forward portion 74a of piston rod 74; a central bore 72g extending forwardly from bore 72e and intersecting inlet passage 72a; and a reduced diameter bore 72h interconnecting threaded bore 72c and central bore 72g. An electric heater band 76 of known form may be provided around the upper end of connector block 72.

The gas injection means 24 of FIGS. 7-8 is mounted in lower mold part 22 for sliding movement in a direction parallel to the parting or mold opening direction of the mold with pin 70 slidably received in a hardened bushing 90 fitted into a reduced diameter portion 88a of a bore 88 in lower mold part 22 and with connector block 72 positioned in an enlarged diameter portion 88b of bore 88 opening in the lower face 22a of the mold part 22.

The gas injector means 24 of the FIGS. 7-8 embodiment is movable between the advanced or gas injection position seen in FIG. 7, corresponding to full advancement of the hydraulic cylinder assembly, where reduced diameter pin portion 72d is positioned in a reservoir 92 communicating with mold cavity 19 so that gas may be introduced into the mold cavity through passages 72a, 72h, 70h and 70i, and a retracted position, seen in dotted lines in FIG. 7 and corresponding to full retraction of the hydraulic cylinder assembly, wherein the pin tip 72d is withdrawn to a position clear of the lower end of the bore 90a of bushing 90 so as to establish a vent passage between the mold cavity and the atmosphere through bore 88a and bore 88b.

As with the other described embodiments, as the pin is returned to its advanced or inserted position as seen in solid lines in FIG. 7 to begin a new injection molding operation, the annular edge 70g on pin 70 coacts with the bore 90a of bushing 90 to perform a self-cleaning operation with respect to the bore so as to remove any obstacles or particles that may have been deposited in the bore either as a result of resin freezing around the pin in the bushing bore during the molding operation or as a result of resin being sucked into the bore as the pin is moved to its retracted position to allow venting of the mold cavity.

In any of the invention embodiments, a check valve 96 may be placed in the central axial bore of the pin between the tip of the pin and the connector block to prevent resin from migrating into the gas line 40 through the central axial bore of the pin in situations where the resin injection pressure within the mold is sufficiently high to permit entry of resin into the central axial bore of the pin. In such situations, the resin will be blown out of the central axial bore of the pin during the next gas injection cycle.

The described embodiments of the invention will be seen to provide improved gas injection means for a gas assisted mold apparatus wherein the gas is readily and effectively delivered to the mold cavity to perform the gas assist operation, the gas is readily vented from the cavity to allow the part to be removed following completion of the molding operation, the seal is effected by the sliding interface of the pin and bore so as to eliminate the component stresses created by the prior art forced sealing arrangements, and the various parts of the gas injection means coact to perform a self-cleaning operation so as to allow the mold apparatus to be used over extended periods of usage without need for maintenance to clean or otherwise maintain the gas injection mechanism.

The invention apparatus may be utilized with the gas assisted injection molding method and apparatus disclosed in my copending U.S. patent application Ser. No. 501,147 wherein the gas pressure within the mold is reduced to a hold pressure until the part has sufficiently set up and, specifically, the retractable pin construction of the present invention may be utilized to achieve the final step of venting the mold from the hold pressure before opening the mold.

Whereas preferred embodiments of the invention have been illustrated and described in detail it will be apparent that various changes may be made in the disclosed embodiments without departing from the scope or spirit of the invention.

I claim:

1. A gas assisted injection molding apparatus in which a supply of resin is introduced into a cavity in a mold at a resin injection location and gas injection means are provided to introduce gas into the mold at a gas injection location removed from the resin injection location to assist the resin in filling out the mold cavity, wherein the gas injection means includes an axially extending bore in the mold communicating with the mold cavity and having uniform size and cross-sectional configuration, a pin including a passage for delivery of gas through the pin and having an axially extending portion having a size and cross-sectional configuration matching the size and cross-sectional configuration of the bore and fitting slidably in the bore and coacting with the bore to form a resin seal during resin injection and gas injection, means mounting the pin for movement between an advanced gas injection position in which the pin is positioned in the bore with its forward tip positioned at least as far forwardly as the forward edge of said bore and in communication with the mold cavity and a retracted position in which the mold is vented through said bore, and means defining an annular edge on said pin portion operative to remove obstructions in said bore with each forward movement of the pin from its retracted position to its advanced position.

2. A gas assisted injection molding apparatus according to claim 1 wherein said annular edge is defined proximate the forward end of said pin portion.

3. A gas assisted injection molding apparatus according to claim 1 wherein said mounting means includes power means movable through a stroke to a fully advanced position and said power means is in its fully advanced position with said pin in its advanced gas injecting position.

4. An apparatus according to claim 1 wherein said annular edge is defined by first and second surfaces on said pin converging to form said edge.

5. An apparatus according to claim 4 wherein said first and second surfaces define an included angle of less than 180° at said edge.

6. An apparatus according to claim 5 wherein said first and second surfaces define and include an angle of no more than 90° at said edge.

7. An apparatus according to claim 6 wherein said first surface is a forward end surface of said pin and said second surface is an annular cylindrical surface defined by said pin portion.

8. A gas assisted injection molding apparatus according to claim 1 wherein said bore and said pin portion are cylindrical in cross section.

9. A gas assisted injection molding apparatus comprising:
   a mold defining a mold cavity;
   means for injecting resin into said cavity at a resin injection location;
   a bore in said mold communicating at its inner end with said mold cavity at a location removed from said resin injection location and having a uniform cylindrical cross-section;
   a pin including a central axial passage for delivery of gas into the mold through the pin and having a cylindrical portion sized to fit slidably in the cylindrical bore and coacting with the cylindrical bore to form a resin seal;
   means mounting the pin for movement between an advanced gas injection position in which the pin is positioned in the bore with its forward tip positioned at least as far forwardly as the forward edge of said bore and in communication with the mold cavity and a retracted position in which the mold is vented through said bore; and
   means defining an annular edge on said cylindrical pin portion operative to remove obstacles in said cylindrical bore with each forward movement of the pin from its retracted position to its advanced position.

10. An apparatus according to claim 9 wherein:
    said pin cylindrical portion comprises a main body portion fitting slidably in said cylindrical bore and said pin further includes a forward reduced diameter portion forming an annular shoulder with said main body portion; and
    said annular edge is defined at the outer circumference of said annular shoulder.

11. An apparatus according to claim 9 wherein:
    said pin includes a front end surface generally normal to the cylindrical surface of said cylindrical pin portion; and
    said annular edge is defined at the intersection of said front end surface and said cylindrical surface.

* * * * *